Patented June 23, 1931

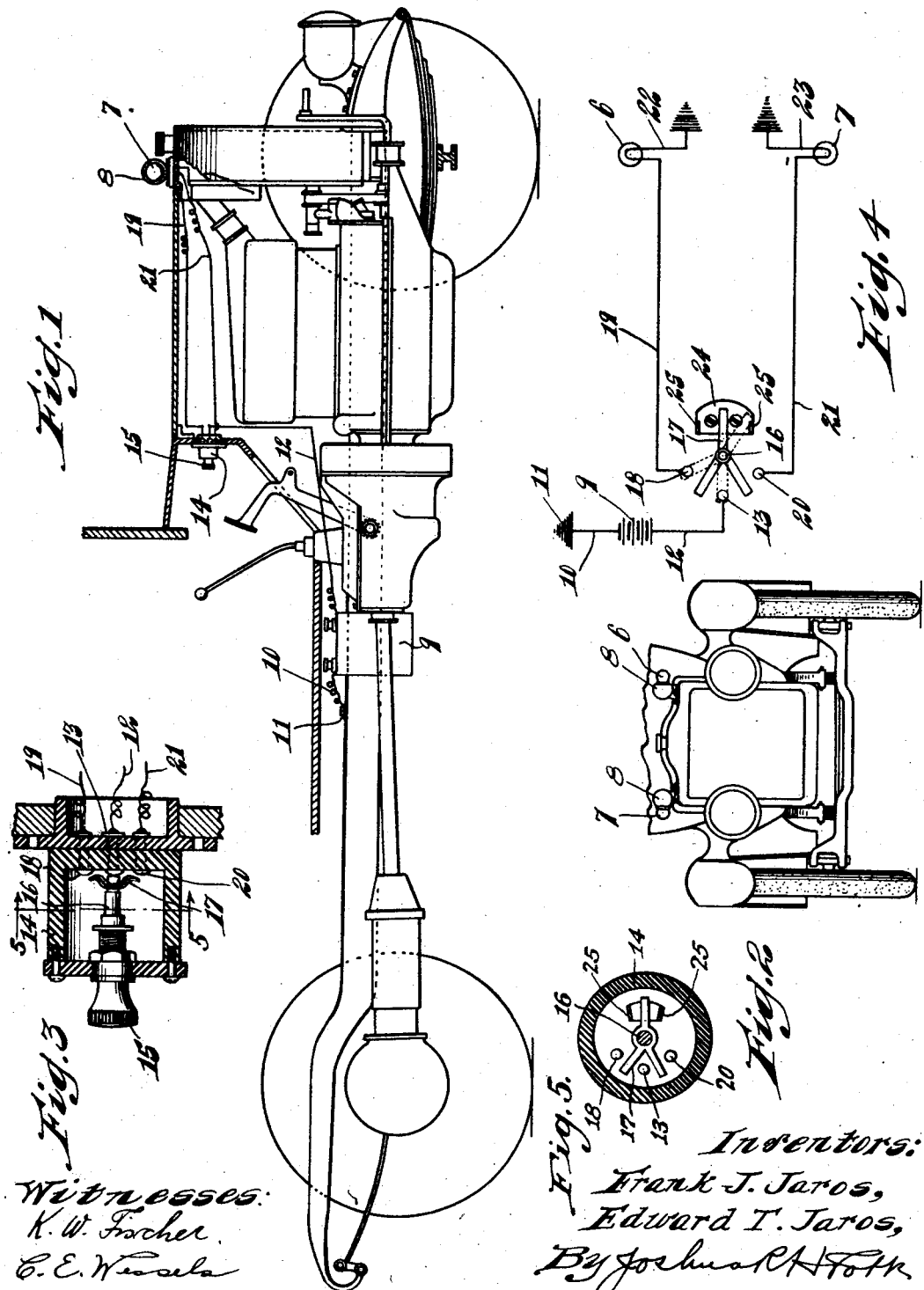

1,810,968

UNITED STATES PATENT OFFICE

FRANK J. JAROS AND EDWARD T. JAROS, OF CHICAGO, ILLINOIS

AUTOMOBILE SIGNALING DEVICE

Application filed December 30, 1927. Serial No. 243,500.

This invention relates to improvements in automobile signaling devices, and more particularly to an improvement in a signaling switch, an object of the invention being the provision of a hand operated switch of simple yet durable construction adapted to alternately and selectively close one of two electric circuits. A more detailed object is the provision of a switch of this character provided with a pair of radially disposed contact arms, a pair of circuit terminal posts, an intermediate terminal connected to a source of electric current, and a third radially extending arm arranged to limit the rotational movement of the switch whereby at one limit of rotational movement the two contact arms connect the source of current with one of the circuits, and at the opposite limit of rotational movement, the two contact arms connect the source of current with the other of the two circuits.

Other objects will appear hereinafter.

The invention consists in the combination and arrangement of parts hereinafter described and claimed.

The invention will be best understood by reference to the accompanying drawings forming a part of this specification and in which Fig. 1 is a side elevation of an automobile chassis with a portion of the hood and radiator shell shown in section to illustrate the application of our device;

Fig. 2 is a front elevation of an automobile showing the signal lights attached to the upper portion of the radiator shell;

Fig. 3 is an enlarged vertical sectional view of the switch for controlling the operation of the lights; and Fig. 4 is a diagram of the wiring system.

Fig. 5 is a cross-sectional view, taken substantially on the line 5—5 of Fig. 3.

As illustrated in the drawings, two signal lights 6 and 7 are mounted, respectively, to the left and right of a longitudinal center line and near the forward end of the vehicle. These lights consist of ordinary electric bulbs and, to render the signals more conspicuous and noticeable, colored bulbs of the same or different colors may be employed, if desired. In the preferred mounting of the lights, as shown, the brackets 8, contain sockets for the bulbs and are bolted through the radiator shell, an opening for the connecting wire being provided directly beneath each bracket in order to avoid having the wires exposed exteriorly of the car.

Our device is preferably used in conjunction with the usual storage battery 9, one terminal of which is connected for grounding by the wire 10 to the frame of the vehicle 11 in the usual manner, the other terminal is connected by the wire 12 to the central post 13 of the switch 14. The switch 14 is preferably mounted upon the instrument board, so as to be conveniently accessible and is operated by the driver by means of a turn button 15. The button 15 is connected to a short shaft 16 at the forward end of which is mounted a Y-shaped contact member 17. The switch post 18 is connected by wire 19 to the lamp 6 located upon the forward left hand side of the vehicle, and the switch post 20 is connected by wire 21 to the oppositely disposed lamp 7. The lamps 6 and 7 are grounded to the frame of the vehicle by wires 22 and 23, respectively, to complete the circuit upon operation of the switch 14. To prevent turning of the switch button 15 too great a distance in either direction, a plate 24 mounted upon the base portion of the switch is provided with upwardly projecting flanges 25, which serve as stops to movement of the contact member 17.

When it is desired to make a left hand turn, for example, the driver turns the switch button 15 in a counterclockwise direction which causes the contact member 17 to assume the position shown in dotted lines in Fig. 4, thus closing the circuit between posts 13 and 18, and causing illumination of the lamp 6; and when it is the driver's intention to make a right turn, the switch button 15 is turned in the opposite direction, whereby the circuit is closed between the posts 13 and 20 by means of the contact member 17 to cause illumination of the lamp 7. It is thus apparent that the driver's intention to turn either to the left or right may be conveyed by means of this device to other drivers and pedestrians either while the car is in motion or stationary, and the wiring arrangement is such that the two signal lights cannot be illuminated simultaneously.

While we have illustrated and described the preferred form of construction for carrying our invention into any use it is capable of variation and modification without departing from the spirit of the invention. We, therefore, do not wish to be limited to the precise details as set forth, but desire to avail ourselves of such variations and modifications as come within the scope of the appended claims.

What we claim as new and desire to secure by Letters Patent is:

1. A manually operated signaling switch adapted to alternately close one of two circuits, comprising a casing, a shaft rotatably mounted within said casing, a contact member mounted upon the end of said shaft and provided with two contact arms, two circuit terminal posts within said casing, connected respectively to alternative circuits, and a central terminal post connected to a source of electric current, whereby rotation of said shaft in opposite directions serves to alternately close the circuit between said central terminal post and one of said circuit terminal posts, said contact arms and posts constructed and arranged to prevent the simultaneous closing of the circuit between said central terminal post and both of said circuit terminal posts and a base plate provided with upturned flanges for restricting movement of said contact arms, substantially as described.

2. A manually operated signaling switch adapted to alternately close one of two circuits, comprising a casing, a shaft rotatably mounted within said casing, a contact member mounted upon one end of said shaft and provided with two radially extending contact arms and a third arm, two circuit terminal posts within said casing, connected respectively to alternative circuits, a central post connected to a source of electric current, a turnbutton mounted upon the opposite end of said shaft, and a base plate provided with upturned flanges adapted to limit the movement of said third arm, whereby at the limit of rotation of said shaft in one direction, the circuit is closed between said central post and one of said circuit terminals, and at the limit of rotation of said shaft in the opposite direction, the circuit is closed between said central post and the other of said circuit terminals.

In testimony whereof we have signed our names to this specification.

FRANK J. JAROS.
EDWARD T. JAROS.